Jan. 12, 1937.　　　　W. C. MULLER　　　　2,067,409
INERTIA CONTROLLED HYDRAULIC SHOCK ABSORBER
Filed Dec. 19, 1932　　　2 Sheets-Sheet 2
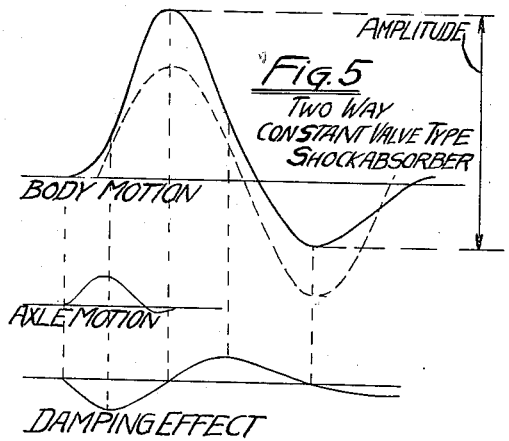
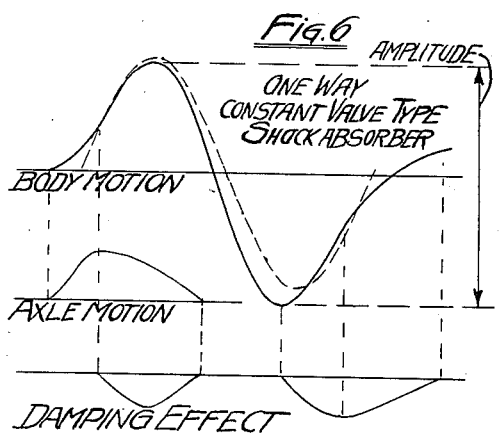
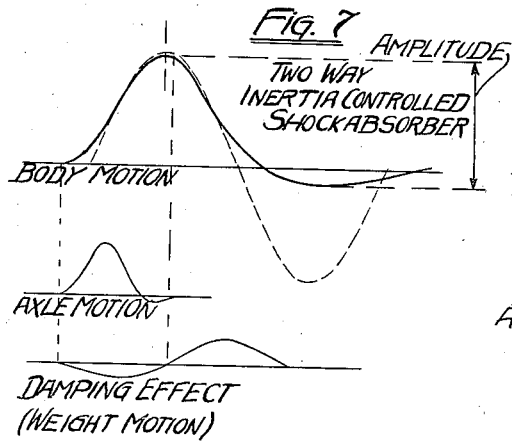
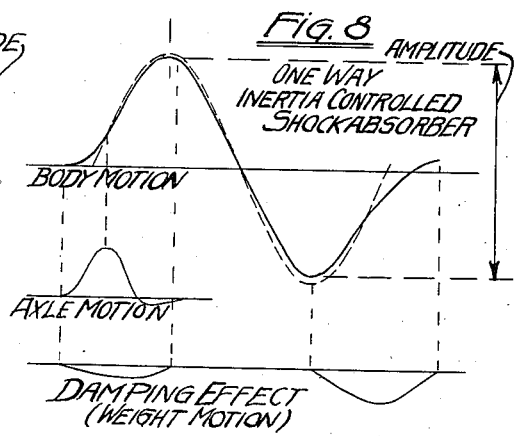
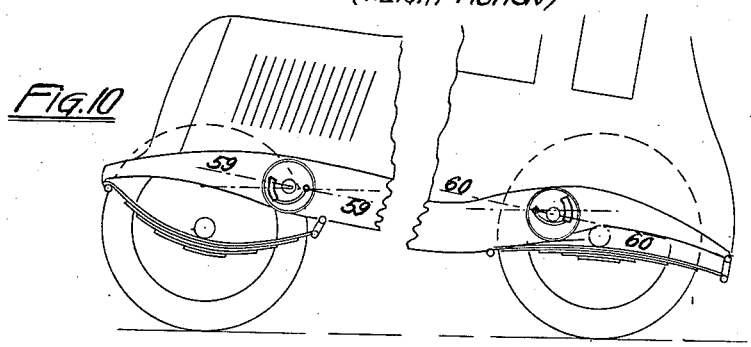
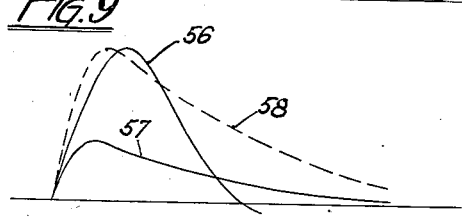
INVENTOR.
Wolfgang C. Muller
BY Allen & Allen
ATTORNEYS.

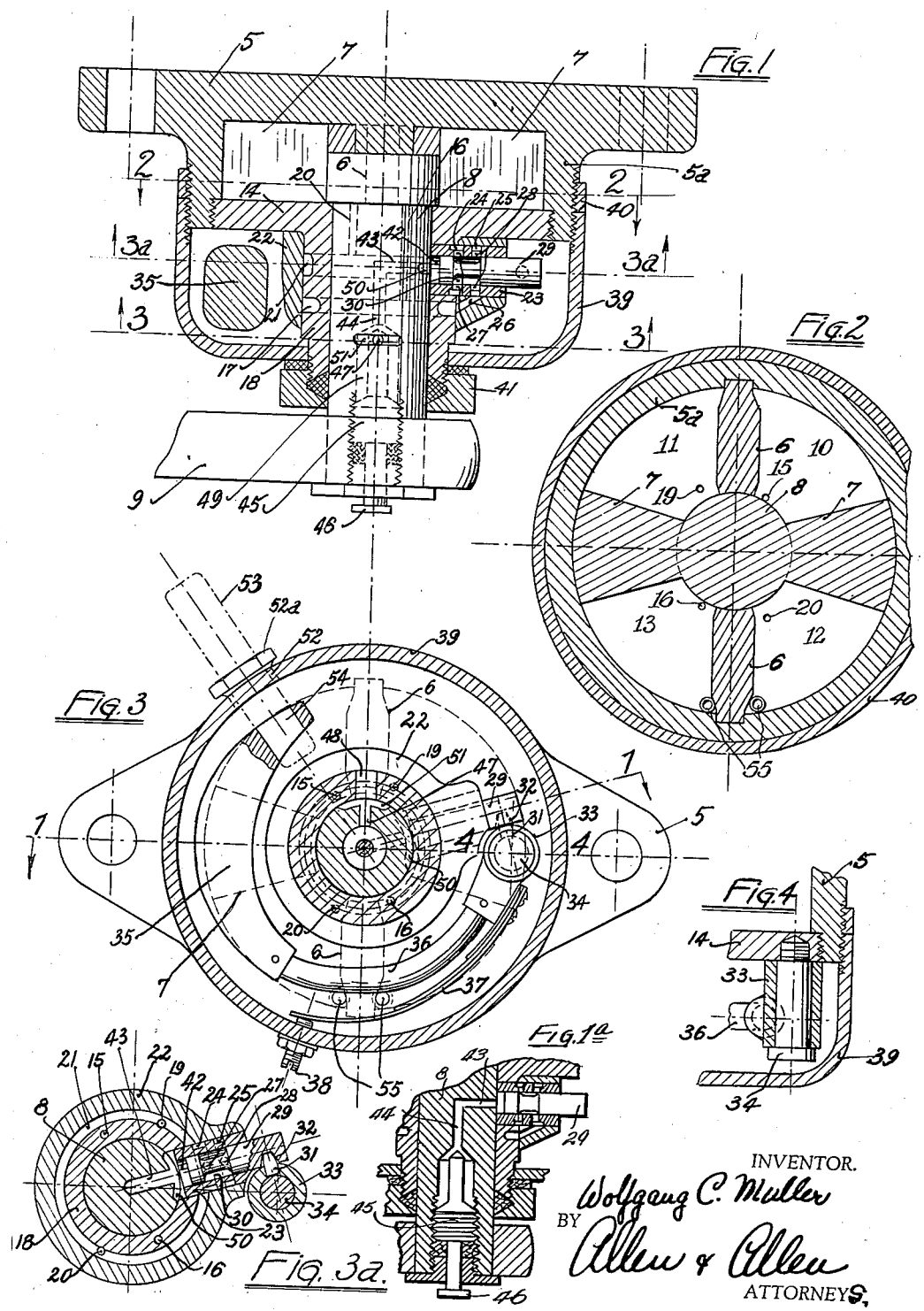

Patented Jan. 12, 1937

2,067,409

UNITED STATES PATENT OFFICE 2,067,409

INERTIA CONTROLLED HYDRAULIC SHOCK ABSORBER

Wolfgang C. Muller, Cincinnati, Ohio; Erna Francesca Muller executrix of Wolfgang C. Muller, deceased Application December 19, 1932, Serial No. 647,854

9 Claims. (Cl. 188—89)

My invention relates to that kind of hydraulic shock absorbers that are controlled by the inertia of suspended weight, and has for its object providing a shock absorber in which the weight operates the resistance controlling valve by moving up or downwardly out of a neutral position.

Another object of my invention is to provide the weight with considerably larger travel than the resistance controlling valve has, thus increasing the inertia effect of the weight.

Another object of my invention is to provide a quicker return to the neutral position of the controlling valve, in order to free the springs of the vehicle for taking up a succeeding shock.

Another object of my invention is to provide a shock absorber, the effect of which increases when the vehicle becomes suddenly longitudinally inclined or pitches, a feature which makes this kind of shock absorber particularly adapted for preventing pitching motion of vehicles with short wheel bases.

Another object of my invention is to provide means for better checking of side sway of the vehicle body.

An object of my invention is to provide means for adjusting the hydraulic damping effect of the shock absorber, regulating the travel of the weight inside the shock absorber, such means operable from the outside.

An object of my invention is to provide a simple automatic compensation for variation in viscosity of the liquid due to temperature changes.

An object of my invention is to suspend the weight with practically negligible friction, so that it always easily returns automatically to the neutral position of the shock absorber.

An object of my invention is to provide means for adjusting the weight to the correct neutral position from the outside.

An object of my invention is to provide a shock absorber which automatically discharges air from the operating chambers and channels, even when the liquid level is low.

Another object of my invention is to provide an inertia-controlled shock absorber which can easily be designed to fit inside of a hydraulic shock absorber which is practical and low in cost, without increasing its overall dimensions.

Other objects will be mentioned in the following description.

In the drawings:

Figure 1 is a horizontal section along the line 1—1 of Fig. 3.

Fig. 1a is a detail sectional view taken on the line 1—1 of Fig. 3.

Fig. 2 is a vertical section along the line 2—2 of Fig. 1.

Fig. 3 is a vertical section on line 3—3 of Fig. 1.

Fig. 3a is a vertical section on line 3a—3a of Fig. 1.

Fig. 4 is a section along line 4—4 of Fig. 3.

Figs. 5, 6, 7, 8 and 9 are diagrams showing vehicle body motions, wheel motions and damping action of different kinds of shock absorbers, and will be described below.

Fig. 10 shows a vehicle installed with shock absorbers of this invention when subjected to a sudden longitudinal inclination.

The base plate 5 is fastened to the body of the vehicle, and has an extension 5a with a circular bore which is divided into two halves by fins 6 fixed therein. Each of these halves is subdivided by the two vanes 7, which are carried by one end of the main shaft 8. This shaft has fixed on its other end the lever 9, which in turn is linked to the axles of the vehicle in such a way that relative vertical movement of body and wheels results in a turning motion of shaft 8 and vanes 7, thus varying the sizes of the chambers 10, 11, 12, 13, between vanes 7 and fins 6. A plate 14 closes the fronts of these chambers, which chambers are filled with liquid, to build up resistance for the relative motions of body and axles.

Liquid passes from chambers 10 and 13 into chambers 11 and 12, or in opposite direction, in the following way: From chambers 10 and 13 drilled passages 15 and 16 lead to a deep ring channel 17 cut in the extension 18 of cover plate 14, which forms a bearing for shaft 8. The other two chambers 11 and 12 are connected through drilled passages 19 and 20 to a shallower ring channel 21 cut in this extension 18. Both ring channels 17 and 21 are closed by ring member 22, which is pressed with a tight fit around the extension 18. Bushing 23 is inserted tightly in a radial bore through ring member 22 and extension 18, and keeps these parts relatively in place. On its outside, bushing 23 is provided with two ring grooves 24 and 25. Groove 24 is directly in connection with shallow ring channel 21, and groove 25 is connected to deep ring channel 17 through passage 26. From ring grooves 24 and 25 holes 27 and 28, placed on opposite sides of bushing 23, lead to the inside of the bushing in which control piston 29 is fitted. The bushing 23 thereby becomes also a cylinder for said piston. It is provided with an annular groove 30, which is just wide enough to leave, in the piston's neutral position, the holes 27 and 28 uncovered as shown in Fig. 1.

It can be readily seen that any movement of piston 29 along its axis in either direction will gradually shut off the flow of liquid between chambers 10, 13 and 11, 12, thus exerting a resistance to the movement of the lever 9. The motion of piston 29 is controlled by the weight carrier which has a gear tooth shaped pin 31, which fits in a similarly shaped hole 32 in the piston. This pin 31 is fastened to the weight carrier hub 33, which swings around stud 34, which is fastened to the cover plate 14. Curved weight 35 is fastened to the curved weight carrier arm 36 fixed to hub 33. A leaf spring 37 is attached to the weight carrier hub 33, with its free end slidably bearing on a set screw 38, which can be adjusted so as to bring piston 29 into the neutral position, it being understood that spring 37 and weight 35 are in equilibrium.

The described mechanism is enclosed by housing 39, which is screwed onto base 5 and locked to it by means of counter-nut 40. Nut 41 and packings are provided to prevent leakage between the shaft 8 and cover plate extension 18 and housing 39.

Piston 29, with its end toward the shaft 8, defines inside of bushing 23 a chamber 42, which changes its size according to the movement of said piston 29. Liquid is therefore drawn into or pushed out of this chamber 42, through radial passage 43 and axial passage 44 in shaft 8. The outer opening of passage 44 can be adjusted by turning screw 45 by means of its part 46, which extends out through the front end of shaft 8. Radial vent holes 47 and 48 are provided in the shaft 8 and bearing extension 18 to allow air or liquid to enter or escape from space 49 around screw 46, inside shaft 8, while piston 29 is moving under the influence of the weight 35. A segmental groove 50 is provided in shaft 8 to maintain connection between chamber 42 and passage 45, and a similar groove 51 in this shaft maintains connection between holes 47 and 48, while shaft 8 is in turning motion.

Filler hole 52, in housing 39, when its plug 52a is removed, admits a test plug 53 to pass into hole 54 of weight 35 only when the latter is adjusted by means of set screw 38 to such a position that control piston 29 is in its neutral position.

One-way valves 55 in cover plate 14 admit liquid to lower chambers 12 and 13, while they are expanding, but prevent escape of liquid therefrom when they are contracting, thus keeping all of the chambers filled with liquid from a supply kept in housing 39, since the upper two chambers 10 and 11 will be filled from lower chambers 12 and 13 in the operation of the device.

In the graphs of Figs. 5, 6, 7 and 8, I have indicated the effects of several known shock absorbers as compared with the action of my shock absorber. In each graph, the horizontal extent indicates time of action; the upper solid curve indicates vehicle body motion above and below a base line indicating normal position of the body, under control of the respective shock absorber; the dotted curve indicates the same without a shock absorber; the next lower curve indicates in the same manner the vehicle axle motion from which the indicated body motions result; and the bottom curve indicates vertically the magnitude of damping effect of the restricted liquid flow, the position of the curve above or below the base line indicating direction of the damping effect, and in case of Figs. 7 and 8 also the weight motion.

Figs. 5 and 6 represent actions of shock absorbers without inertia control of their valves. Fig. 7 represents the action of my device. Fig. 8 represents the action of a device with one way liquid flow, the valve being inertia controlled, as for example in United States patents to James Lang, No. 1,448,131, dated March 13, 1923, and No. 1,492,328, dated April 29, 1924.

In Fig. 5 with the two-way constant valve device, the car is thrown up rather high because the shock absorber so reduces the vehicle spring action while the wheel goes up that the body gains a greater upward momentum; but during the downward motion of the body damping becomes effective and checks this motion so that the car is fairly ready to pass over a new obstacle.

In Fig. 6 with the one-way constant-valve device, the body receives a lesser push upward, since the shock absorber does not transmit any shock in this direction; but then because the shock absorber prevents the wheel and axle from quickly coming down relatively to the body, the body will drop so much lower that the amplitude of the body swing will be about as large as with the two way shock absorber of Fig. 5. Then the rebound of the body will be checked.

The effect regarding comfort with the device of Fig. 6 will be about the same; with the advantage for the two-way constant-valve shock absorber of Fig. 5 that the vibration will be more quickly checked. Therefore the car will probably be safer when the succession of bumps is close, as on rough roads, with the device of Fig. 5.

With inertia-controlled shock absorbers, however, there is a much more pronounced advantage with my two-way type than with the one-way type of Fig. 8.

In Fig. 7, with a two-way inertia-controlled shock absorber of my invention, when the vehicle wheels hit a bump and the vehicle body starts up the weight 35 will lag, constricting the flow from the chambers 11 and 12, effecting a slight damping of the upward movement. Then the weight is carried up so that just after the car body starts to move down, the weight 35 will, due to its received upward acceleration, swing up past its neutral position somewhat farther than it moved below said position, and therefore give a quick check to the downward movement of the car body.

In the one way inertia-controlled shock absorber the weight is ineffective during the downward movement. The vehicle body must therefore swing all the way downward as shown in Fig. 8, and the movement will not be checked until in the upward swing. Not only does it take much more time until the equilibrium is reached, but also the amplitude of the swing is much larger. In fact there is only a slight improvement in this one-way inertia-controlled device over the one-way device of constant-valve type of Fig. 6.

My two-way inertia-controlled shock absorber, on the other hand, shows a greatly reduced amplitude and a quick return of the body to the equilibrium, thus increasing considerably riding comfort and riding safety.

When the wheels of the vehicle, instead of being thrown upward, drop down in a hole of the road, the process of Fig. 7 will be simply inverted without changing the principle of operation of my device, which works identically in both directions.

In order to achieve the result of my device indicated in Fig. 7, a correct timing of body motion and inertia weight motion must be effected.

The motion of the weight inside of the housing is merely the lag between moving vehicle body and the forced vibration of the inertia weight, and this lag is a function of the elasticity of the spring 37, that is, the amount the spring deflects under a given weight. If the elasticity of the spring is too great (soft spring) the lag of the weight will be larger and its action of the weight will be delayed; on the other hand, if the elasticity would be too small (stiff spring), the action of the weight would be advanced; both cases prevent the proper timing of weight motion as shown in Fig. 7. Generally speaking, the spring 37 supporting the inertia weight 35 should be for best results of such elasticity, that after the vehicle body has been moved out of its equilibrium, that is its condition in which it is resting on the supporting springs, the weight at first lags behind the body motion, moving the valve out of its neutral position, thereby effecting a damping action on the body motion; then, while the body retards and reverses its motion, the weight swings back through its neutral position, and then while the body returns to its position of equilibrium, the weight swings to the opposite side, reaching the peak of this swing during the return motion of the body, preferably at a time when the body has returned about half way to its position of equilibrium and terminating this swing during the return motion of the body to this position of equilibrium, substantially as shown in Fig. 7. This effects that the valve first dampens the body motion in the quickest manner and then opens quickly to give the wheels freedom for following the road contour.

It will be noted that the weight 35 makes a double swing inside its housing, one to each side of its neutral position, with the effect that the second swing has a greater amplitude than the first. To explain this I have to consider the forces acting on the weight. Relating to Fig. 7, during the initial upward movement the car body receives an upward acceleration, during which the weight will lag behind. Then when the axle moves downward, the body will become subject to downward acceleration according to the distance of the body from the equilibrium. The weight now will be moved upward in relation to the body, first on account of the downward acceleration of the body; second, on account of the weight supporting spring. Each of those accelerations would be sufficient to make the weight pass its neutral position and perform a second swing; each of those accelerations is governed by its peculiar laws. It is the object of this invention to have the spring supporting the weight provided with such an elasticity that the mentioned accelerations coincide thereby bringing about that during the return motion of the body toward its equilibrium the weight moves to the opposite side of its neutral position, this second swing being of larger amplitude than the first. If the accelerations are not timed, it may happen that they are opposed and no swing of the weight would take place. From the above derivation it can be easily seen that such a large swing can only occur at a downward motion after an upward motion (or an upward motion after a downward motion), and therefore an untimely closing of the shock absorber is prevented.

By having the weight travel considerably larger than the travel of the controlling valve, the designer is free to choose the travel of the controlling valve most suitably, which is usually not more than a few thirty-seconds of an inch. For such small quantities and high pressures as are used in hydraulic shock absorbers, valves which have considerably larger travel will be complicated and difficult to manufacture.

This large relative travel of the weight also largely increases its inertia effect, as the more movement the weight is allowed, the more force it can exert upon the valve to make the latter overcome the forces of fluctuations which originate from dynamic pressure variations in the rapidly flowing liquid. This increased force of action on the valve also decreases the danger of the valve sticking if foreign matter enters it, thus increasing the operating safety of the device.

Another advantage of the different weight travel relative to the controlling valve travel enters into a matter before mentioned, in that in order to obtain proper timing between car motion and weight action, as indicated in Fig. 7, a certain elasticity of the spring 37 is necessary. This relation on the other hand involves a certain amount of weight swing, which would otherwise be beyond the designer's choice, whereas by my invention ne may choose the proper weight swing out of the given conditions imposed by spring elasticity and combine the same with the most practical valve travel.

A further advantage is that the proper amount of weight damping can be chosen. The damping should not be stronger than just enough to prevent the weight from swinging considerably over the neutral position. This amount of damping can be calculated or found experimentally, and the result of this is indicated by curve 56 in Fig. 9. If the damping is much stronger, a curve similar to 57 in Fig. 9 will indicate the action of the weight, which in this case very slowly approaches the neutral position. For easy comparison, I have duplicated curve 57 as of the same height as curve 56, by dotted curve 58. This curve 58 shows very clearly the disadvantage of over-damping compared with curve 56, which shows about the proper amount of damping. The latter much earlier returns to the neutral position, making the spring free for taking up new motions. Such a feature is essential for proper functioning on rough roads. The freedom of choice of weight travel and valve travel in my invention makes it easy to determine the proper weight damping, and the resulting weight travel, and to link this to the most practical valve travel.

When one end of the vehicle body is thrown up suddenly, the other end goes down to a certain amount, called "pitching" of the vehicle. Very often, when the road contour is suitable, the pitching effect becomes cumulative, resulting in a strong resonance motion of the vehicle. I have arranged the inertia weights of the shock absorbers at the respective axles of the vehicle so that their suspension points are towards the middle of the vehicle from the center of gravity of the weight, as shown in Fig. 10. When a vehicle is in a pitching motion it involves an angular inclination of the body at each end, as shown in lines 59—59 and 60—60 in Fig. 10. This will cause a deflection of the weight from its neutral position similar to that caused by a simple up and down movement of the body, as indicated in the two shock absorbers shown in Fig. 10.

Such pitching inclination becomes additive to the vertical motion in the effect upon the inertia weight and conversely the damping action exerted by the weight on such inclination. Because in vehicles with short wheel bases the angular inclination, as shown in Fig. 10, is very pronounced, and is one of the greatest objections to vehicles with short wheel bases, my invention greatly helps toward improving such cars.

When the vehicle suddenly goes into a curve, the vehicle body, due to its inertia, derives a rolling motion or side sway, lowering the body on the outside and lifting it on the inside of the curve. My shock absorbers, due to the inertia of their weights, will quickly check these rolling or side sway movements by acting on both sides of the vehicle in a way similar to that whereby they check longitudinal or pitching motions by acting at both ends as described above. A one-way inertia controlled shock-absorber will check such motions only at one side at a time, leaving the other side free to swing. My shock-absorbers are particularly useful on a car equipped with so-called independent springing, which in the customary design shows a particularly great tendency for side swaying.

To adjust the damping action, and thus the actual weight travel for a given body motion, it is desirable to have the amount of damping action adjustable from its outside after its installment on the vehicle. For instance, there are slight manufacturing differences in the shock absorbers as well as in the cars necessitating final adjustment. During the use, differences in shock absorbers or on the vehicle may develop. Furthermore, the load on a certain chassis varies when using different car bodies in it, or, during the car use, when applying varying loads to it. A heavier load will require a stiffer shock absorber to check the vibrations.

As it would not be proper to vary the stiffness of the spring 37 in the shock absorber to meet those various conditions for the reasons previously mentioned, I vary the amount of damping by screw 45, operated by its extension 46, by varying the opening of 44, to control the flow of liquid from and to chamber 42, and hence its resistance to the valve and weight. This control will not interfere with the proper valve timing because damping has only a negligible influence on frequency of vibrations.

It is necessary for an efficient shock absorber that its damping effect is uniform regardless of the change in liquid temperature resulting from weather condition or from the operation of the shock absorber. In order to achieve this the controlling valve must close the liquid passages more if the liquid is warm and less when cold. The weight travel which is linked to the valve travel must therefore be larger if the liquid is warm and smaller if the liquid is cold. In my invention the orifice 44, which is of substantial length, effects such a regulation automatically because when the liquid is cool its increased viscosity reduces the valve travel by increasing the resistance to the valve motion. When the liquid is warm the resistance at the orifice to valve travel will automatically decrease due to the decreased viscosity, resulting in a larger valve travel. In fact since flow through the controlling valve 29 as well as through orifice 44 is so-called viscous flow, in which quantity of flow is directly proportionate to the liquid pressure, and the viscosity change is the same in both cases, the effect of any viscosity change will be completely compensated. So that the valve will automatically return to its neutral position, the mechanical friction of the operating parts must be reduced to as much as possible. Otherwise the valve will not leave the wheels free to move up and down and therefore prevent proper action. As a means of reducing the mechanical friction I have arranged a leaf spring so that it supports the assembly of weight 35, connection 36 and hub 33 under the combined center of gravity of these parts, on set screw 38. Thus the weight of these parts is not imposed on the stud bearing at all. Also by having the weight swing around an axis distant from the center of gravity of the weight, I reduce the friction at the axis, as on any pendulum, or as a wheel reduces the resistance to a moving vehicle. The effect of this mounting of the parts is of particular advantage during the acceleration or retardation period of the vehicle when the weight, due to its inertia, tends to exert a pressure on the stud 34, or when the valve, tending to dampen the weight motion, tends to exert a pressure upon stud 34 through tooth 31.

The valve 29 of my design is axially movable and hydraulically balanced. This has the advantage that hydraulic pressure does not impose any mechanical friction on the valve and so impede the motion of the weight.

In manufacturing the device differences in the springs and during its use, unforeseen circumstances may bring the weight out of its proper neutral position. In order to check the proper position of the weight, as adjusted up or down by set screw 38, I have provided for gauging its position through the filler hole 52 in housing 39, which ordinarily is closed by the screw plug 52a, by putting an opening 54 in the weight, so that a pin 53, shown in dash-dotted lines in Fig. 3, pushed through the filler hole 52 can enter weight opening 54 only when the weight 35 is in proper position.

If, through neglect or accident, the level of liquid in housing 39 should become too low to keep the controlling valve submerged, air may enter the passages and chambers around the valve 29, and being compressible, permits the weight to swing too much, since its motion is not properly damped. Means are known in the art which discharge the air from the operating chambers 10, 11, 12, 13. The rapidly flowing liquid will carry the air from the passages 17 and 21, notch 30 in piston 29, and the ring passages 24 and 25 into the operating chambers 10—13. When pressure builds up in the operating chambers, some liquid is forced from the chambers into the bearing around the shaft 8, and gradually fills up passages 43, chamber 42 and 49, while the air is gradually taken out with the liquid thus forced through the bearing. Liquid also will pass from notch 30 in piston 29 into chamber 42, when the notch is under pressure and chamber 42 under vacuum. Air will further escape from chamber 42 when it is under pressure and notch 30 is under vacuum. Thus the operation is such that all the air tends to be dissipated, allowing the shock absorber to function normally.

I have invented an inertia-controlled shock absorber which possesses the mentioned advantages and can be built inside of the housing of a shock absorber which is practical and low in cost, without increasing its overall dimensions. By giving the weight 35 and arm 36 the curved form, as shown in Fig. 3, they will have considerable motion without striking the housing, or with the shaft bearing and the valve mechanism support. At the same time the complete valve and weight mechanism is completely enclosed against dirt and damage. A larger housing 39 to make up for space taken by the weight and the other new parts is hardly necessary because an inertia-controlled shock absorber of this kind heats up the liquid less than a constant valve type shock absorber of the same capacity because there is a minimum of unnecessary damping and heating of the liquid compared with that which takes place in the constant valve type shock absorber.

Modifications in construction and uses of my invention may occur, and I do not wish to be understood as being limited to the precise disclosure herein, but what I claim as new and desire to secure by Letters Patent, is:—

1. In a hydraulic shock absorber comprising a weight and a valve operated by said weight, a cylinder, a piston operated by said weight inside of said cylinder, an inlet and outlet passage connected to said cylinder, means operable from the outside of the shock absorber for adjusting the resistance to liquid entering and leaving said cylinder through said passage.

2. In a hydraulic shock absorber, control means comprising a rotatable hub element, a weight element, an element connecting said hub to said weight, a spring supporting said elements under the combined center of gravity of the three elements.

3. In a device of the character described, comprising a shaft rotating subject to checking action of liquid, a cylindrical enclosure around said shaft supplying liquid to said means, a valve movable to control action of said liquid-checked means, and a weight structure, a mounting on which said weight structure is pivoted to swing in said enclosure, curved around said shaft and operatively related to said valve to increase the checking action of the liquid on said means by swinging in either direction from a neutral position under the force of its inertia.

4. In a device of the character described, comprising liquid-checked means and an enclosure supplying liquid to said means, a valve movable to control action of said liquid-checked means, a weight structure, a mounting on which said weight structure is pivoted to swing in said enclosure, operatively related to said valve to increase the checking action of the liquid on said means by swinging in either direction from a neutral position under the force of its inertia, and a spring attached to said weight structure adjacent to its pivoted mounting and supported by a wall of said enclosure near the center of gravity of said weight structure.

5. In combination with a hydraulic shock absorber mechanism, a valve, an elastically balanced weight mounted upon said valve for governing said valve and mechanism, means for damping the motion of said weight relatively to said mechanism, and means for adjusting the degree of said damping.

6. In combination with a hydraulic shock absorber mechanism, a valve, an elastically balanced weight mounted upon said valve for governing said valve and mechanism, means for damping the motion of said weight relatively to said mechanism, and means for adjusting the degree of said damping, having an operating extension outside of the shock absorber.

7. In a shock absorber comprising members connected to respective relatively movable objects, means confining liquid to flow in one member under pressure of the other member, a valve checking said flow by movement from a neutral position in one direction or another, a weight mounted on said valve to cause said movement by its inertia to movement of the other member, an enclosure for said weight on said one member, and a device operable from the outside of said enclosure for adjusting the weight and valve to their neutral positions, said weight and said casing being provided with openings adapted to be in registry when said weight and valve are in neutral position and a closure for said opening in said casing.

8. In a hydraulic shock absorber, a valve for varying the resistance of the shock absorber, a weight elastically suspended from and operating said valve, hydraulic means for damping said weight, and for varying the damping effect in accordance with temperature effects on the viscosity of the liquid, comprising an orifice having substantial length and connecting with said valve.

9. In a hydraulic shock absorber, a valve for varying the resistance of the shock absorber, a weight elastically suspended from and operating said valve, adjustable hydraulic means for damping said weight, and for varying the damping effect in accordance with temperature effects on the viscosity of the liquid, comprising an orifice connecting with said valve and having substantial length, and a valve therein.

WOLFGANG C. MULLER.